United States Patent [19]

Williams

[11] 4,373,666
[45] Feb. 15, 1983

[54] ENGINE COOLING-PASSENGER HEATING SYSTEM

[75] Inventor: Donald L. Williams, Port Clinton, Ohio

[73] Assignee: General Motors Corporation, Detroit, Mich.

[21] Appl. No.: 277,869

[22] Filed: Jun. 26, 1981

[51] Int. Cl.³ .............................................. B60H 1/02
[52] U.S. Cl. ................................... 237/12.3 B; 165/51
[58] Field of Search .................... 237/8 C, 12.3 B; 123/41.08, 41.09, 41.1; 251/331

[56] References Cited

U.S. PATENT DOCUMENTS

| | | | |
|---|---|---|---|
| 2,668,014 | 2/1954 | Lund | 237/8 |
| 2,672,293 | 3/1954 | Ludlow | 237/8 |
| 2,848,169 | 8/1958 | Obermaier | 236/79 |
| 3,656,689 | 4/1972 | Budzich et al. | 237/8 |
| 3,779,307 | 12/1973 | Weiss et al. | 237/12.3 B |
| 3,966,119 | 6/1976 | Harter et al. | 237/12.3 B |
| 4,195,777 | 4/1980 | Ikebukuro et al. | 237/12.3 B |

FOREIGN PATENT DOCUMENTS 524887  4/1955  Italy ................................... 251/331

Primary Examiner—William R. Cline
Assistant Examiner—John F. McNawly
Attorney, Agent, or Firm—R. L. Phillips

[57] ABSTRACT

An engine cooling-passenger heating system is disclosed having an integrated multi-mode valve arrangement which operates in a no-heat mode to bypass all available flow to the passenger heater past the heater for continued circulation without disruption in the engine cooling system and further operates in a heat mode to effect flow through the heater while also being responsive to the pressure drop across the heater above a predetermined value to also simultaneously establish in the heat mode a restricted connection bypassing a portion of the available coolant to the heater to thereby limit the flow through the heater as well as the pressure differential acting thereon.

3 Claims, 2 Drawing Figures

ENGINE COOLING-PASSENGER HEATING SYSTEM

This invention relates to engine cooling-passenger heating systems and more particularly to such systems wherein the passenger heater is connected in series with the engine cooling system.

In vehicles wherein the engine cooling system is plumbed in series with the passenger heater, it has been found undesirable to completely shut off flow to the heater where there is no passenger heater demand since this disrupts flow continuity in the engine cooling system. For example, this is particularly undesirable in the case of small engines employing water jacketed intake manifolds since disruption of circulation through the water jacket can adversely affect carburetion. Moreover, in such series plumbed systems, it is desirable to protect the heater from damage engendered by excessive pressure differentials across the heater and/or by the erosive affects of prolonged high coolant flow rates therethrough.

The engine cooling-passenger heating system according to the present invention provides a practical solution to such problems with an integrated multi-mode valve arrangement between the passenger heater and a heater supply outlet and return inlet in the engine's cooling system which serve the heater but must somehow always remain interconnected to maintain flow continuity within the engine cooling system. The integrated multi-mode valve arrangement of the present invention operates in a no-heat mode to directly connect the engine cooling system heater supply outlet to the engine cooling system heater return inlet and thereby directly bypass (short circuit) all flow past the passenger heater to thereby maintain flow continuity in the engine cooling system. Alternatively, the multi-mode valve connects the engine cooling system heater supply outlet to the heater inlet and the heater outlet to the engine cooling system heater return inlet to effect flow through the heater in a heat mode. But moreover, the multi-mode valve in its heat mode is responsive to pressure drop across the heater above a predetermined value to automatically and simultaneously establish a restricted or limited direct connection between the engine cooling system heater supply outlet and return inlet to thereby effect limited bypass flow pass and thus limited flow through the heater. This provides the added advantages of minimizing the strength requirements and prolonging the life of the heater by the effective limitation on the maximum pressure drop thereacross and the flow therethrough. In the preferred embodiment, the switching between the no-heat and heat modes is accomplished with a vacuum operated servo while the splitting of the heat mode which operates to maintain engine cooling system circulation while limiting pressure drop across the heater is effected automatically by a spring biased pressure sensing arrangement.

These and other objects and advantages and features of the present invention will become more apparent from the following description and drawing in which.

Figure 1:
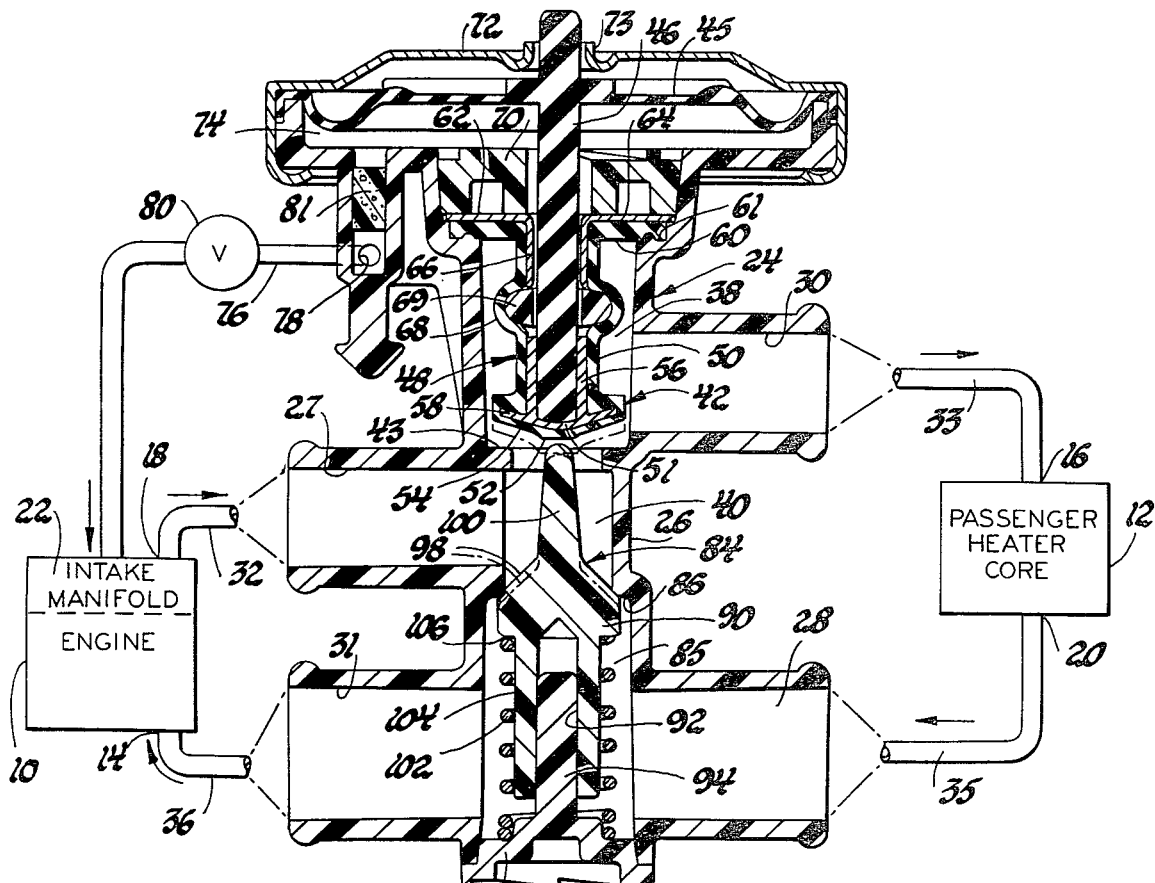
FIG. 1 is a view partially diagrammatic and partially in detail of the preferred embodiment of the engine cooling-passenger heating system according to the present invention, the integrated multi-mode valve arrangement being shown in vertical cross-section and in its heat mode.

Referring to FIG. 1, there is shown a vehicle engine cooling-passenger heating system comprising a radiator cooled engine 10 (radiator not shown) and a passenger heater 12 each having respectively an inlet 14, 16 and outlet 18, 20 for the circulating coolant in the system. Furthermore, the engine includes a water jacketed intake manifold 22 which is where the engine cooling system heater supply outlet 18 to the passenger heater is located. It will be understood, of course, that the engine additionally has a separate inlet and outlet (not shown) for the radiator serving the engine's cooling system.

An integrated multi-mode valve arrangement 24 is connected in the engine cooling-passenger heating system between the engine and passenger heater inlets 14, 16 and outlets 18, 20 and comprises a plastic injection molded valve body 26 which itself has a pair of inlets 27, 28 and a pair of outlets 30, 31. As shown in FIG. 1, the valve body's inlets and outlets are adapted to be connected by hoses in the engine cooling-passenger heating system; the valve body inlet (heater supply) 27 being connected by a hose 32 to the engine cooling system heater outlet (heater supply) 18 at the intake manifold 22, the valve body outlet (heater supply) 30 being connected by a hose 33 to the passenger heater inlet 16, the other valve body inlet (heater return) 28 being connected by a hose 35 to the heater outlet 20 and the other valve body outlet (heater and bypass return) 31 being connected by a hose 36 to the engine inlet (heater return) 14. The valve body 24 further includes two distinct but joined valve chambers 38 and 40 which contain movable valve assemblies and provide for certain connections between the valve body's inlets and outlets as will now be described.

Figure 2:
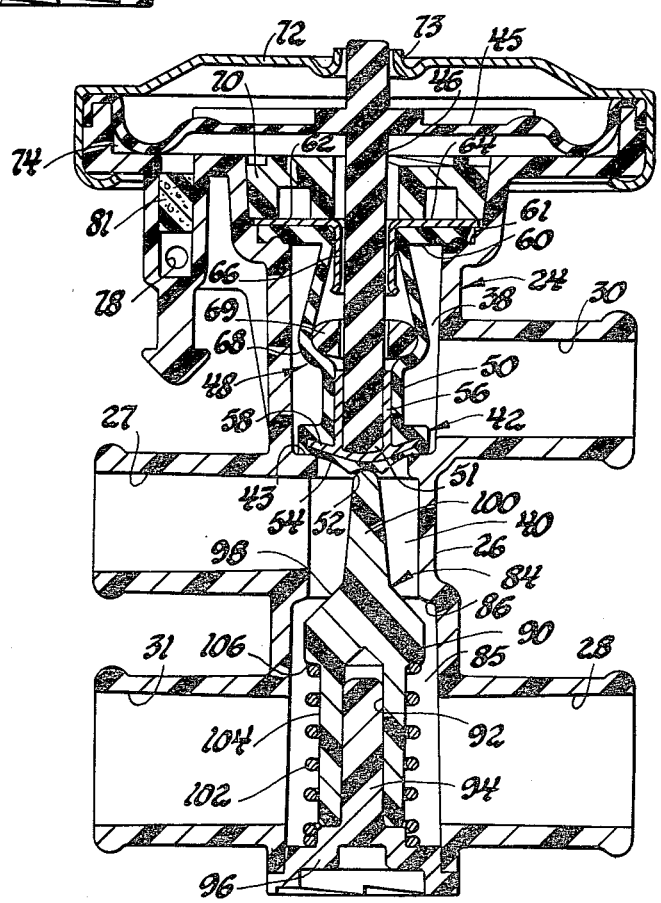
FIG. 2 shows the integrated multi-mode valve arrangement in FIG. 1 in its no-heat mode.

In the upper portion of the valve body 26 including the upper valve chamber 38 there is accommodated a push rod operated valve assembly 42 which in the open position shown in FIG. 1 connects the valve inlet 27 from the engine cooling system to the valve outlet 30 to the heater and in the closed position shown in FIG. 2 blocks such connection by engaging an annular valve seat 43 formed in the valve body where the upper valve chamber 38 which is open to the valve outlet 30 joins with the lower valve chamber 40 which is open to the valve inlet 27.

The valve assembly 42 comprises a plastic injection molded diaphragm 45 having a centrally located cylindrical push rod or plunger 46 formed integral therewith. A unitized or one-piece valve-spring-seal member 48 injection molded of elastomeric material has a thin wall tubular portion 50 with an open end through which it is received over the push rod 46. The valve-spring-seal member 48 is closed at the other (bottom) end opposite the operating end 51 of the push rod and has a valve head 52 on which an annular tapered concave valve face 54 is externally formed thereon that is adapted to engage the valve seat 43. A hollow mushroom-shaped rigid reinforcement insert 56 of metal is received over the operating end 51 of the push rod between it and the tubular portion 50 of the valve-spring-seal member 48 and has a crown 58 whose rim extends radially outward into the valve head 52 to help support or reinforce same.

The tubular portion 50 has a radially outwardly projecting annular seal flange or collar 60 formed integral therewith about its open end and thus most remote from the valve head 52. The seal flange 60 extends sufficiently outward so as to engage on its fluid flow side with a singular annular rib seal seat 61 formed in the valve body at this end (upper end) of the valve chamber 38. A stamped sheet metal rod guide-seal retainer member 62 has an annular radial section or flange 64 which engages the opposite side of the elastic seal flange 60. The rod guide-seal retainer member 62 further has an integral sleeve or bushing 66 which is received about the push rod 46 and extends in close-fitting relationship into the elastic tubular portion 50 to both support same and guide the push rod on this side (lower side) of the diaphragm 45. The tubular portion 50 further has an outwardly projecting single corrugation 68 intermediate the valve head insert 56 and rod guide 66 to provide the elastic tubular portion 50 with a spring section and compliance that will normally yieldingly hold the valve head 52 in its open position shown in FIG. 1 and accommodate the movement of the valve head to its closed position shown in FIG. 2 on vacuum actuation of the diaphragm 45 as described in more detail later. Moreover, a plastic injection molded annular reinforcement insert 69 is located in the corrugation 68 and is slidably received on the push rod 46 to prevent collapsing of the corrugation on the plunger as will also be described in more detail later.

A plastic injection molded cap 70 is received about the push rod 46 between the diaphragm 45 and rod guide-seal retainer member flange 64 and is spun welded in place to the valve body to hold the rod guide-seal retainer member 62 and thereby the static seal 60 in sealing contact with the valve body thus completely blocking off fluid communication of the valve chamber 38 with the diaphragm 45. The push rod 46 also extends a slight way from the opposite side of the diaphragm 45 or upward as shown and there is provided a stamped sheet metal cover 72 which is crimped about its periphery to the valve body and has a centrally located opening with a neck 73 which receives and helps guide the push rod at this end while also venting the upper side of the diaphragm to atmosphere by its relatively loose fit with the push rod. The cover 72 sealingly clamps the periphery of the diaphragm 45 against the valve body and the latter combination forms a chamber 74 on the underside of the diaphragm which when supplied with vacuum pulls the diaphragm and thus the push rod 46 downward from its normally held open position shown in FIG. 1 to the actuated or closed valve effecting position shown in FIG. 2.

A vacuum source such as the engine intake manifold 22 is connected to the valve's vacuum chamber 74 by a hose 76, this connection being made through a nipple 78 in the valve body and there being provided a valve 80 in the vacuum line 76 which may be controlled manually or automatically to some prescribed schedule to effect the desired vacuum actuation of the valve 24. A compressed and dried cellulose sponge plug 81 is mounted in the vacuum connection in the valve body and in its dry state is sufficiently porous to freely pass the air for valve actuation. However, if for any reason liquid is allowed to enter the chamber 74, the then saturated plug quickly expands so as to effectively seal the vacuum line thereby preventing any cooling-heating system liquid from entering the engine's intake manifold.

There are thus no dynamic or sliding seals required to isolate the valve's actuating chamber 74 from the fluid in valve chamber 38, there simply being a single static seal provided by the seal portion 60 of the unitized valve-spring-seal member 48 which if effected at valve assembly. Moreover, the unitized valve-spring-seal member 48 is by virtue of the valve head reinforcement insert 56, the rod guide 66 and most particularly the donut-shaped reinforcement insert 69 in which the push rod 46 is free to slide, entirely internally supported against the external fluid forces acting thereon in the valve chamber 38. As a result, the elastomeric material of the valve 48 can only be compressively stressed due to such fluid forces, in this case the hydrostatic forces. Thus the spring bias and compliance built into the unitized elastomeric valve spring-seal member remains fully effective to provide for its inherently held position as well as movement to its actuated position. The diaphragm actuated-rod operated valve assembly described above is preferably like that disclosed in greater detail in applicant's copending U.S. patent application Ser. No. 204,634 entitled "ROD OPERATED VALVE", filed Nov. 6, 1980 and assigned to the assignee of the present invention and which is hereby incorporated by reference.

Describing now the details of the lower portion of the integrated multi-mode valve arrangement, the lower valve chamber 40 provides for bypass communication between the valve body's heater supply inlet 27 and heater and bypass return outlet 31 and together with a valve body cavity 85 accommodates a poppet valve assembly 84. The poppet valve assembly 84 in its full open position shown in FIG. 2 connects the heater supply inlet 27 to the heater and bypass return outlet 31 and in the closed position shown in FIG. 1 blocks such bypass connection by engaging an annular valve seat 86 formed in the valve body cavity 85 where the latter joins with the lower valve chamber 40. The valve cavity 85 serves to accommodate or house the poppet valve assembly whose further details will now be described as well as provide for continuous communication between the valve body's heater return inlet 28 and the heater return and bypass outlet 31.

The poppet valve assembly 84 comprises a plastic injection molded reciprocable valve member 90 having a central blind bore 92 in its lower end by which it is received and guided thereby on an upstanding pin 94 having a cylindrical base 96 integral therewith which serves as both a lower sealing cap for the valve body as well as a spring seat for the poppet valve. The pin 94 and base 96 are also a plastic injection molded part and the base 96 is spun welded in place in the lower end of the valve body cavity 85 to seal off this cavity and thereby the juncture between the valve body's heater return inlet 28 and heater return and bypass outlet 31 which are continuously open to each other around the poppet valve assembly. The poppet valve member 90 has an annular conical valve face 98 which is adapted to engage the valve seat 86 and in addition, has a centrally located upwardly extending and integral pin-shaped valve operator 100 which is engaged by the push rod operated valve assembly 48 at its valve head 52 when the latter is moved toward its previously described closed position to positively effect bypass flow as will be described in more detail later.

A coil spring 102 is received about a reduced diameter section 104 of the movable poppet valve member 90 and seats at its lower end on the base 96 and at its uper end on a radial shoulder 106 on the valve member. The spring 102 is preloaded at assembly and operates to bias the poppet valve member 90 upward to engage its valve face 98 with the valve seat 86 to block the connection to close this valve opening and block bypass communication between the valve body's inlet 27 and outlet 31 in the heat mode. With such valve arrangement and bias, opening movement of the poppet valve member 90 against the bias of spring 102 is caused to occur at a predetermined elevated pressure differential between the pressure acting on the exposed poppet valve face 98 and pin 100 and the pressure operating in the opposite direction on the exposed underside of the poppet valve member (which pressure differential thus reflects the pressure drop across the passenger heater). When this occurs, the poppet valve member valve face 98 is moved off its valve seat 86 to a partially open bypass position as shown in phantom line in FIG. 1 to thus effect limited regulated bypass flow in what will be referred to as a split heat mode to prevent pressure differential excursions beyond the preset value from acting on the heater as well as preventing excessive flow rates through the heater.

Describing then a typical operation of the above-described integrated multi-mode valve arrangement 24 in the engine cooling-passenger heating system, when vacuum is cut off from the vacuum chamber 74 and the latter is vented by the valve 80, the push rod operated valve assembly 48 is normally held in its open position while the poppet valve assembly 84 is normally held in its closed position by reason of the spring force. Coolant from the engine cooling system then flows through the valve body inlet 27 and out the valve body outlet 30 to the passenger heater 12 and thence returned through the other valve body inlet 28 and the other valve body outlet 31 to the engine cooling system for continued circulation. This, of course, is the heat mode. Alternatively, when no passenger heat is desired, i.e. the no-heat mode, vacuum is applied through the valve 80 to the vacuum chamber 74 causing the push rod operated valve assembly 48 to move to its closed position shown in FIG. 2 blocking flow to the valve body outlet 30. Simultaneously, the push rod operated valve head 52 through engagement with the poppet valve extension 100 causes the poppet valve to move to its full open position shown in FIG. 2 allowing all the coolant delivered to the valve body inlet 27 to short circuit or bypass the heater 16 and return through the valve body outlet 31 to the engine cooling system to thereby maintain flow continuity therein.

This is the normal sequence of events. However, while in the heat mode with the vacuum servo actuated push rod operated valve 48 in its open position and at high valve body inlet flows from the engine cooling system (e.g. high engine speeds) the pressure drop across the passenger heater may increase substantially and this is reflected across the poppet valve 84. When this pressure differential exceeds a preset value, as determined by the preload of the biasing spring 102, the poppet valve 84 will be forced to open thereby to effect limited bypass flow past the poppet valve directly to the valve body outlet 31. This bypass flow in the thus established split heat mode limits flow through the passenger heater thereby preventing excessive erosive flows from occurring therethrough as well as preventing excessive pressure differentials from acting on the passenger heater to thereby minimize its strength requirements.

The above described preferred embodiment is illustrative of the invention which may be modified within the scope of the appended claims.

The embodiments of the invention in which an exclusive property or privilege is claimed are defined as follows:

1. An engine cooling-passenger heating system comprising an engine and a passenger heater each having an inlet and outlet for a cooling-heating liquid wherein the engine outlet to the heater is at a liquid jacketed intake manifold on the engine, and multi-mode valve means for connecting said engine outlet to said engine inlet to thereby bypass all liquid flow past said passenger heater for a no-heat mode while maintaining flow circulation through the jacketed intake manifold and alternatively connecting said engine outlet to said heater inlet and said heater outlet to said engine inlet to thereby effect flow through said heater for a heat mode while also being responsive to pressure drop across said heater above a predetermined value to also simultaneously establish in said heat mode a restricted connection between said engine outlet and said engine inlet to thereby effect limited bypass flow past and limited flow through said heater to maintain circulation through the jacketed intake manifold while minimizing the strength requirements of the heater.

2. An engine cooling-passenger heating system comprising an engine and a passenger heater each having an inlet and outlet for a cooling-heating liquid wherein the engine outlet to the heater is at a liquid jacketed intake manifold on the engine, and multi-mode valve means including integrated vacuum controlled valve means and pressure differential and spring-bias controlled valve means for connecting said engine outlet to said engine inlet with vacuum control to thereby bypass all liquid flow past said passenger heater for a no-heat mode while maintaining flow circulation through the jacketed intake manifold and alternatively connecting said engine outlet to said heater inlet and said heater outlet to said engine inlet again with vacuum control to thereby effect flow through said heater for a heat mode while also being responsive to pressure drop across said heater above a predetermined value to also simultaneously establish in said heat mode a restricted connection between said engine outlet and said engine inlet with pressure differential and spring bias control to thereby effect limited bypass flow past and limited flow through said heater to maintain circulation through the jacketed intake manifold while minimizing the strength requirements of the heater.

3. An engine cooling-passenger heating system comprising an engine and a passenger heater each having an inlet and outlet for a cooling-heating liquid wherein the engine outlet to the heater is at a liquid jacketed intake manifold on the engine, and multi-mode valve means including integrated vacuum controlled valve means and pressure differential and spring bias controlled valve means for connecting said engine outlet to said engine inlet with vacuum control and combined operation of said integrated valve means to thereby bypass all liquid flow past said passenger heater for a no-heat mode while maintaining flow circulation through the jacketed intake manifold and alternatively connecting said engine outlet to said heater inlet and said heater outlet to said engine inlet again with vacuum control and combined operation of said integrated valve means to thereby effect flow through said heater for a heat mode while also being responsive to pressure drop across said heater above a predetermined value to also simultaneously establish in said heat mode a restricted connection between said engine outlet and said engine inlet with said pressure differential and spring bias controlled valve means to thereby effect limited bypass flow past and limited flow through said heater to maintain circulation through the jacketed intake manifold while minimizing the strength requirements of the heater.

* * * * *